(No Model.) 3 Sheets—Sheet 2.
C. C. HENDERSON.
CORN AND SEED PLANTER.

No. 357,003. Patented Feb. 1, 1887.

WITNESSES
Edwin T. Yewell,
W. F. Huntemann.

INVENTOR
Charles C. Henderson,
by W. J. Johnston
Attorney (No Model.) 3 Sheets—Sheet 3.
C. C. HENDERSON.
CORN AND SEED PLANTER.
No. 357,003. Patented Feb. 1, 1887.
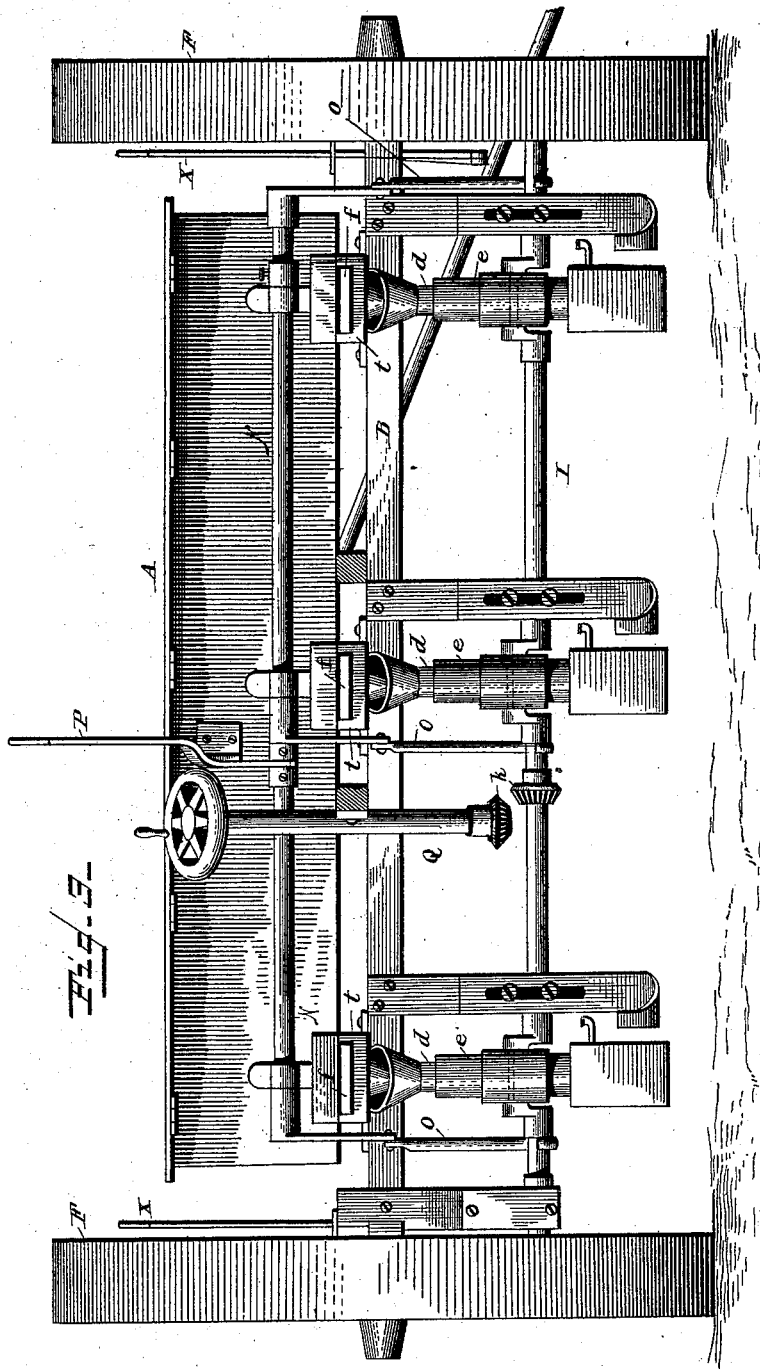
WITNESSES
Edwin L. Yewell,
W. F. Huntemann
INVENTOR
Charles C. Henderson,
by _____
Attorney

UNITED STATES PATENT OFFICE.

CHARLES C. HENDERSON, OF WARREN, PENNSYLVANIA.

CORN AND SEED PLANTER.

SPECIFICATION forming part of Letters Patent No. 357,003, dated February 1, 1887.

Application filed October 21, 1886. Serial No. 216,860. (No model.)

*To all whom it may concern:*

Be it known that I, CHARLES C. HENDERSON, a citizen of the United States, residing at Warren, in the county of Warren and State of Pennsylvania, have invented certain new and useful Improvements in Corn and Seed Planters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to seed-planters, and is an improvement on the patent granted to me November 9, 1886, No. 352,186. Its objects are to produce a more perfect checkrower than heretofore, to provide means for designating the starting-point at either end, to bring the planters or seed-depositors in proper position at the starting-point, and to better regulate the feed.

It consists in certain details of construction and arrangement of parts hereinafter described, and pointed out in the accompanying drawings, in which—

Figure 1:
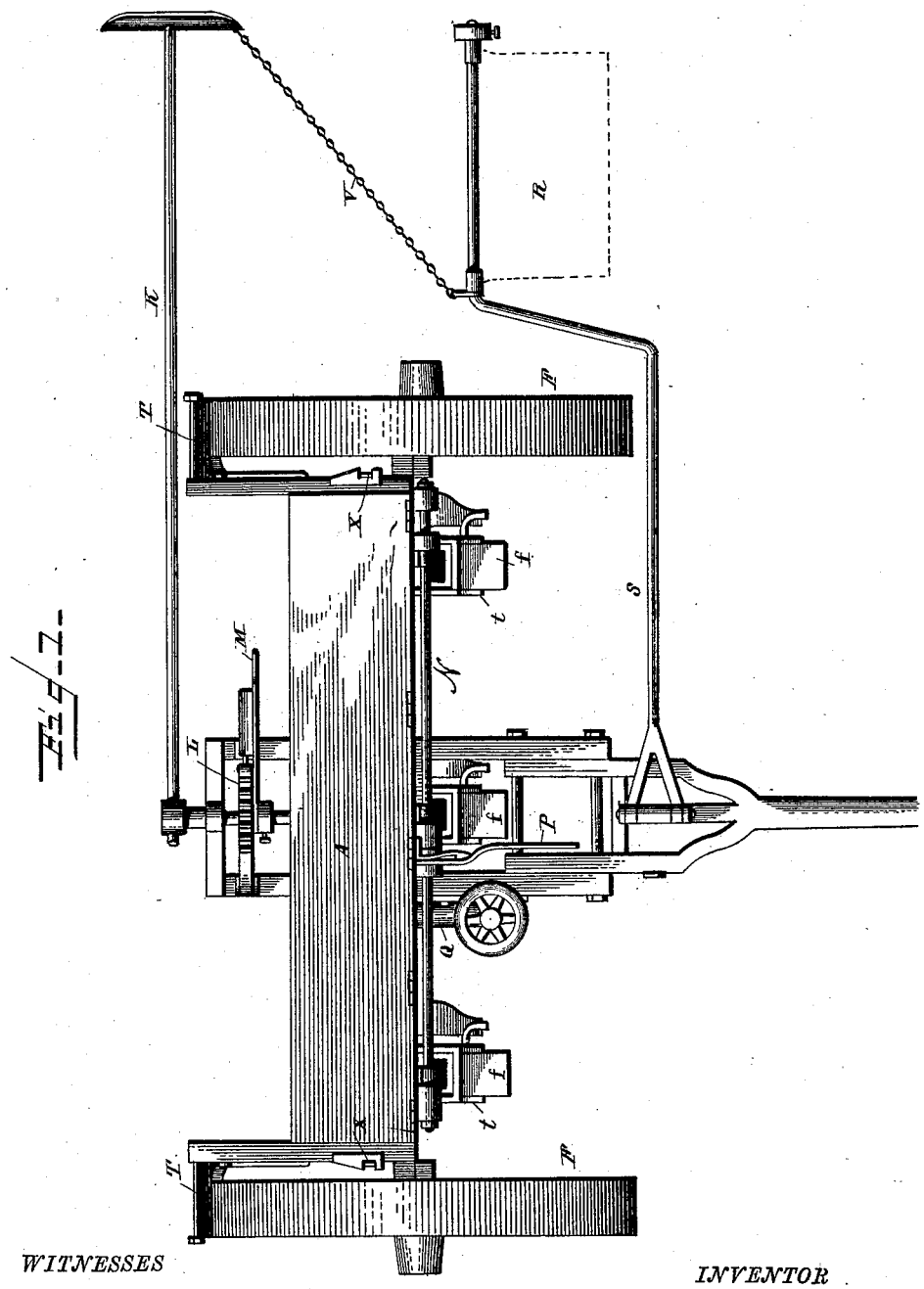
Figure 2:
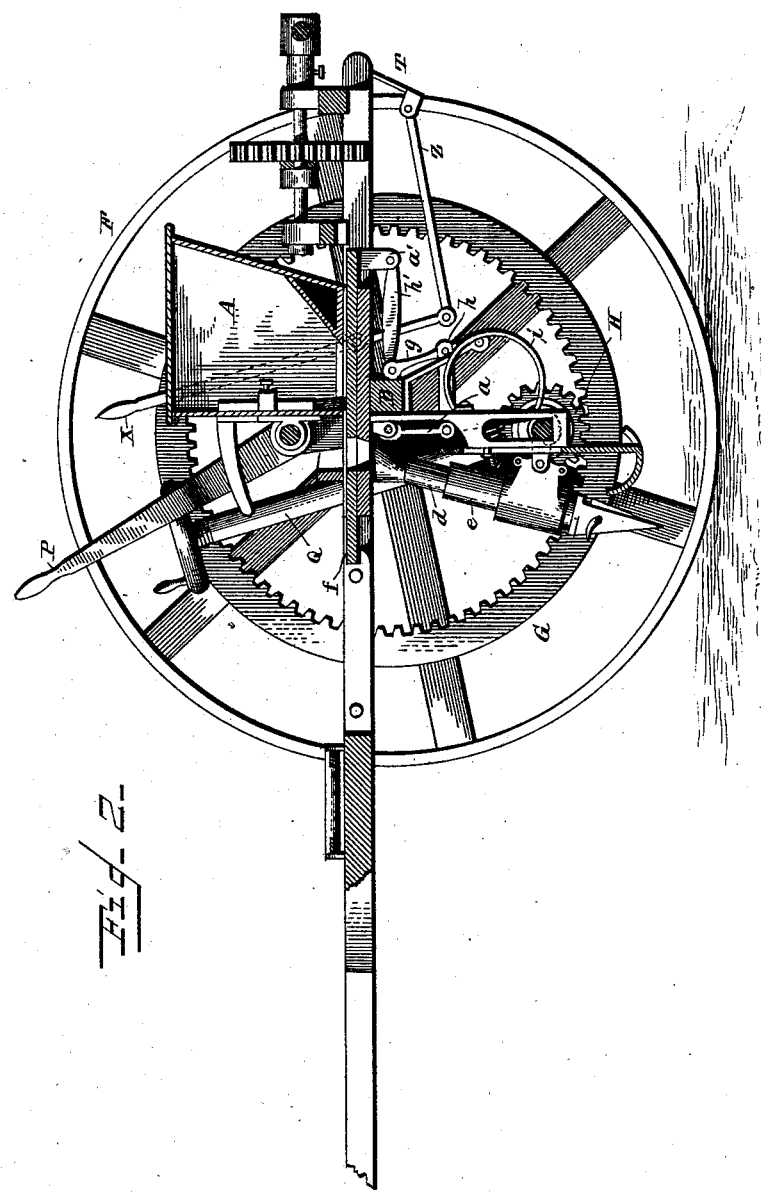

Figure 1 is a plan view of my machine with the improvements attached. Fig. 2 is a vertical cross-section. Fig. 3 is a front elevation of my device.

Referring more particularly to the drawings, A represents the seed-box or reservoir, which is mounted upon and supported by an axle, B, of any desired or suitable length, its front face being flush with the front face of the axle.

The seed-dropping mechanism does not differ materially from that shown and described in my former application, and consists of a series of apertures in the bottom of the seed-reservoir, an automatic slide-valve for opening and closing said apertures, a perforated track upon which the slide-valve moves, and a telescopic delivery-tube beneath the track having a valved planting-foot through which the seed is delivered.

The axle B is supported by the drive-wheels F, its ends being so bent at the point of entering the hubs that it occupies a position equal to its own width back of the center of the drive-wheels, thereby differing in that respect from my former construction. The upper part or section, $d$, of my seed-conductors is hinged to the valve-track in front of the axle instead of to the axle, as in my former application, and the interior rim or flange, G, on the drive-wheels is provided with cogs to impart a positive motion to the pinion-wheels H on the ends of the crank-shaft I, which actuates the planting mechanism, consisting of the telescopic seed-conductors $d$ $e$ and the automatic valve $f$, which discharges the seed into the telescopic seed-conductor.

The telescopic seed-conductors are attached to the cranks of the crank-shaft I, as in my former application, and the valve $f$ is actuated by means of the arms $a$ $a'$, (the first of which, $a$, is secured to and moves with the upper section, $d$, of the seed-conductor, and the other, $a'$, to the rear end of the valve,) the intermediate lever, $g$, and pitmen $h$ $h'$. This construction operates the valve more satisfactorily than that shown in my former application.

$i$ represents a leaf-spring in the boxing, which I have substituted for the spiral spring shown in my former application, for holding the shaft I and pinion-wheels H down upon the flange of the drive-wheels.

K represents a marker or check-rower, designed to form a track or guide for the pole or tongue of the machine when returning across the field, and consists in a foot or shoe upon the end of a rod pivoted at the rear of the machine and extending outward a sufficient distance beyond the track of the drive-wheel to form a line to be followed by the pole of the machine as a guide on the return trip. This marker is made reversible, and may be adjusted to either side of the machine by means of the ratchet-wheel L, to the hub of which it is secured, and the reversible pawl and lever M.

A rod or rock-shaft, N, extends across and is pivotally secured in front of the seed-reservoir, and is connected with the crank-shaft I by jointed arms O, by means of which the crank-shaft is raised when the rock-shaft is revolved and the pinions H are released from contact with the cogged rim or flange G, thereby throwing the planting or seed-dropping mechanism out of gear. The rock-shaft is actuated by means of a lever, P, within reach of the driver.

Q is an upright shaft, provided at its upper end with a wheel or crank and loosely secured to a projecting stud or arm from the axle, in front of the feed-reservoir, and connecting with the crank-shaft I by beveled gearing k, whereby the crank-shaft may be turned when the machine is at rest.

R is an indicator or marking-flag, located on the outer end of a rod, s, pivotally secured to the pole in front of the machine, whereby it is made reversible, and extending outwardly parallel with the marker-rod K and connected with it by a chain, v, so that it will operate in unison with the marker.

T is a scraper designed to bear on the outer face of the drive-wheel and operated by a lever, x, within reach of the driver, and a pitman, z, connecting the lever and scraper.

The operation of my device is as follows: The machine is started across the field, and the pinion-wheels H, resting on the cogged flange G of the drive-wheels, revolve the cranked shaft I, (to the cranks of which are secured the lower ends, e, of the telescopic seed conductors or tubes,) causing the tubes to vibrate forward and backward and projecting the planting-foot into the ground, as described in my former application. The seed-conductor, in its forward-and-backward movement, carries with it the arm a, and, by means of the pitmen h h', the lever g, and the arm a', actuates the valve f and permits a proper amount of seed to be discharged from the seed-reservoir into the seed-conductors. This operation is continued until the opposite side of the field is reached and it becomes necessary to turn the machine and repeat the operation. The planting mechanism is then thrown out of gear by raising the pinion-wheels H from contact with the cogged flange G through the medium of the lever P, rock-shaft N, and jointed arms O, and the pole is placed in line with the check-row made by the marker K. The indicator or marking-flag R and the check-rower K are now reversed by means of the ratchet-wheel L and lever M, and the former brought in line with the row already planted. It here becomes necessary to see that the planters or seed-delivery tubes occupy a vertical position in line with the flag or indicator R; and if out of line, they are brought to this position by the vertical shaft Q, by means of which the crank-shaft I may be turned while the machine is at rest until the seed-delivery tubes occupy a vertical position in line with the indicator R and the first row already planted. The machine then proceeds, and the former operation is repeated.

Having thus described my invention, what I claim, and desire to secure by Letters Patent, is—

1. In a seed-planter provided with toothed flanges on the driving-wheel for revolving the crank-shaft for operating the seed-planting mechanism, as described, the combination, with the said crank-shaft, of the rock-shaft having the jointed arms and the vertical shaft Q, provided at its lower end with a beveled wheel adapted to mesh with a similar beveled wheel on the crank-shaft when the latter is raised out of gear with the drive-wheels, whereby the crank-shaft may be revolved when so out of gear with the drive-wheels, substantially as and for the purpose described.

2. The combination, in a seed-planter, of the driving-wheel having an interior flange or ring provided with teeth, the cranked shaft provided at its ends with pinions bearing against said toothed flange of the driving-wheel, the planting mechanism operated by said cranked shaft, the rock-shaft provided with a lever for oscillating same, the jointed arms connecting it with the crank-shaft, and the vertical standard provided at its lower end with a beveled gear adapted to engage with a similar beveled gear on the crank-shaft when the latter is raised from contact with the drive-wheels, substantially as and for the purpose set forth.

3. In a seed-planter, the combination, with the seed-conductors, of a valve actuated by arms one of which is secured to and moves with the seed-conductor and the other to the rear end of the valve, said arms being connected by means of an intermediate lever and pitmen, substantially as and for the purpose described.

4. In a seed-planter, the combination, with the planting mechanism, of a front indicator consisting of a rod pivotally secured to the pole in front of the machine and supported thereby, said rod at its outer end having an indicating-flag secured thereto, substantially as and for the purpose described.

5. In a seed-planter, the combination, with the planting mechanism, of a check-rower pivotally and reversibly secured to the rear of the machine and a front indicator the inner end of which is pivotally secured to the pole, its outer end having an indicating-flag secured thereto, said check-rower and indicator being connected by a rod or chain, whereby they may be reversed together and made to operate in unison, substantially as and for the purpose set forth.

In testimony whereof I affix my signature in presence of two witnesses.

CHARLES C. HENDERSON.

Witnesses:
EMMA M. GILLETT,
NEWTON B. LOVEJOY.